(12) United States Patent
Krishnamoorthy

(10) Patent No.: US 10,970,199 B2
(45) Date of Patent: *Apr. 6, 2021

(54) SYSTEM FOR METAMORPHIC RELATIONSHIP BASED CODE TESTING USING MUTANT GENERATORS

(71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,307

(22) Filed: Apr. 24, 2020

(65) Prior Publication Data

US 2020/0257618 A1 Aug. 13, 2020

Related U.S. Application Data

(63) Continuation of application No. 16/267,658, filed on Feb. 5, 2019, now Pat. No. 10,642,723.

(51) Int. Cl.
*G06F 8/40* (2018.01)
*G06F 11/36* (2006.01)
*G06N 20/00* (2019.01)

(52) U.S. Cl.
CPC ............ *G06F 11/3688* (2013.01); *G06F 8/40* (2013.01); *G06F 11/3684* (2013.01); *G06F 11/3692* (2013.01); *G06N 20/00* (2019.01)

(58) Field of Classification Search
CPC ............ G06F 11/3688; G06F 11/3684; G06F 11/3692; G06F 8/40; G06N 20/00
See application file for complete search history.

(56) References Cited

U.S. PATENT DOCUMENTS 5,550,951 A 8/1996 Woodall
5,559,690 A 9/1996 Keeler et al.
(Continued)

OTHER PUBLICATIONS

Muhammad Bilal Bashir and Aamer Nadeem, Control Oriented Mutation Testing for Detection of Potential Software Bugs, IEEE, 2012, retrieved online on Jan. 12, 2021, pp. 35-40. Retrieved from the Internet: <URL: https://ieeexplore.ieee.org/stamp/stamp.jsp?tp=&arnumber=6424294>. (Year: 2012).*

(Continued)

*Primary Examiner* — Hanh Thi-Minh Bui
(74) *Attorney, Agent, or Firm* — Michael A. Springs; Moore & Van Allen PLLC; Vaidehi Bachot

(57) ABSTRACT

Embodiments of the invention are directed to metamorphic relationship based code testing using mutant generators. The system is configured for identifying and remediating defects in an original program based on constructing at least one mutated program by distorting the original program, and analyzing expression of mutants in test results. In particular, the system receives a request to perform defect analysis of an original program. In response, the system constructs a first mutated program by embedding one or more mutants in the original program code. Moreover, the system typically maps the one or more mutants to one or more metamorphic relationships of process functions of the original program. The system may then implement tests of the original program and the first mutated program by providing one or more predetermined test cases as input to both, to determine whether the original program comprises at least one defect.

20 Claims, 7 Drawing Sheets

(56) References Cited

U.S. PATENT DOCUMENTS

| | | | |
|---|---|---|---|
| 5,649,065 | A | 7/1997 | Lo et al. |
| 6,314,414 | B1 | 11/2001 | Keeler et al. |
| 6,591,254 | B1 | 7/2003 | Keeler et al. |
| 7,610,108 | B2 | 10/2009 | Boe et al. |
| 7,958,495 | B2 | 6/2011 | Kelso |
| 8,117,021 | B2 | 2/2012 | Atkin et al. |
| 8,694,540 | B1 | 4/2014 | Lin et al. |
| 8,843,427 | B1 | 9/2014 | Lin et al. |
| 8,862,527 | B2 | 10/2014 | Garner |
| 8,924,938 | B2 | 12/2014 | Chang et al. |
| 9,111,224 | B2 | 8/2015 | Hunzinger |
| 9,239,986 | B2 | 1/2016 | Lin et al. |
| 9,329,582 | B2 | 5/2016 | Boe et al. |
| 9,406,017 | B2 | 8/2016 | Hinton et al. |
| 9,965,719 | B2 | 5/2018 | Choi et al. |
| 10,311,368 | B2 | 6/2019 | Lokare et al. |
| 10,438,118 | B2 | 10/2019 | Dwarakanath et al. |
| 2005/0234753 | A1 | 10/2005 | Pinto et al. |
| 2007/0150424 | A1 | 6/2007 | Igelnik |
| 2008/0270841 | A1 | 10/2008 | Quilter |
| 2010/0293175 | A1 | 11/2010 | Vadrevu et al. |
| 2012/0284212 | A1 | 11/2012 | Lin et al. |
| 2015/0006148 | A1 | 1/2015 | Goldszmit et al. |
| 2018/0018582 | A1 | 1/2018 | Unsal et al. |

OTHER PUBLICATIONS

Xiaoyuan Xie et al., Testing and Validating Machine Learning Classifiers by Metamorphic Testing, Jan. 11, 2010, retrieved online on Mar. 15, 2020, pp. 1-37. Retrieved from the Internet: <URL: http://citeseerx.ist.psu.edu/viewdoc/download?>. (Year: 2010).

* cited by examiner

SYSTEM FOR METAMORPHIC RELATIONSHIP BASED CODE TESTING USING MUTANT GENERATORS

CROSS-REFERENCE TO RELATED APPLICATION(S)

This application is a continuation application of and claims priority to U.S. patent application Ser. No. 16/267,658, filed Feb. 5, 2019, of the same title; the contents of which are also incorporated herein by reference.

FIELD OF THE INVENTION

The present invention generally relates to the field of testing and debugging program code. In particular, the novel present invention provides a unique metamorphic relationship based code testing using mutant generators. Embodiments of the invention are configured for identifying and remediating defects in program code by fundamentally and systematically transforming the program code based on metamorphic relationships.

BACKGROUND

Increasingly prevalent computers, mobile phones, smart devices, appliances, and other devices, require a variety of programs operating in tandem. However, these programs may comprise errors and defects, which if not identified and corrected in time may lead to malfunctioning of the program itself and/or other related programs and the devices that run them. However, in conventional systems, the testing of program code primarily relies on debugging code and/or data validation. First, this conventional testing process, however, is not compatible for testing programs having complex structures such as machine-learning programs or deep-learning programs which have multiple layers of neural networks that do not lend themselves to the conventional methods. Second, conventional methods are not configured for identifying root causes of inaccuracies, particularly in the case of machine-learning programs or deep-learning programs, thereby precluding any accurate/precise corrections of the program code to rectify the defects. Third, the conventional testing processes are heavily reliant on test cases for testing programs, and may not be able to identify defects when other use cases are provided to the program. Conventional testing methods are most likely to designate lack of model training data or test data as the cause for errors in machine-learning programs or deep-learning programs, even if the program code itself is erroneous (e.g., program code may comprise architectural configuration issues, interference state issues, or implementation issues, etc. that are causing the errors/inaccuracies in reality). Particularly in the case of machine-learning programs or deep-learning programs, an error/bug cannot be determined in conventional testing systems through a few instances of inaccuracies during testing using test cases, because machine-learning programs or deep-learning programs are inherently constantly evolving (e.g., their accuracies improve over-time). Moreover, this conventional process while not being reliably accurate is also time intensive and laborious. Therefore, a need exists for a novel system that overcomes the foregoing shortcomings of conventional system.

The previous discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or the foregoing deficiencies of conventional systems, addresses the foregoing identified needs and provides improvements to existing technology by providing an innovative system, method and computer program product for metamorphic relationship based code testing using mutant generators. The invention is configured for identifying and remediating defects in an original program based on constructing at least one mutated program by distorting the original program, and analyzing expression of mutants in test results. Typically the system comprises: at least one memory device with computer-readable program code stored thereon; at least one communication device; at least one processing device operatively coupled to the first proctor module application and the second proctor module application, the at least one memory device and the at least one communication device. Executing the computer-readable code is configured to cause the at least one processing device to: receive, via an operative communication channel with a user device, a user request to perform defect analysis of an original program; and retrieve original program code associated with the original program. The system may then determine one or more metamorphic relationships associated with one or more process functions of the original program based on analyzing the original program. Next, the system typically constructs a first mutated program. Here, the system typically constructs one or more mutants, wherein each mutant of the one or more mutants is constructed by distorting a portion of the original program code. The system then constructs the first mutant program based on embedding the one or more mutants in the original program code. Next, the system typically maps the one or more mutants to the one or more metamorphic relationships.

During the testing process, the system implements a first test by providing one or more predetermined test cases as input to the original program. As a result of the first test the original program may provide an original test output. Moreover, the system implements a second test by providing the one or more predetermined test cases (same test cases provided to the first test) as input to the first mutated program. Subsequently, the first mutated program provides a first mutated test output in response to the second test. The system then determines whether the original program comprises at least one defect based on at least comparing the original test output to the mutated test output.

In some embodiments, or in combination with any of the previous embodiments, determining whether the original program comprises the at least one defect, further comprises: determining whether the original test output matches the mutated test output; and determining that the original program comprises the at least one defect based on at least determining that the original test output matches the mutated test output.

In some embodiments, or in combination with any of the previous embodiments, determining whether the original program comprises the at least one defect, further comprises: determining whether the original test output matches the mutated test output; and determining that the original program does not comprise the at least one defect based on at least determining that the original test output does not match the first mutated test output.

In some embodiments, or in combination with any of the previous embodiments, the original program is a machine learning model program or a deep learning model program.

In some embodiments, or in combination with any of the previous embodiments, the system is further configured to: in response to determining that the original program comprises the at least one defect, determine a first mutant of the one or more mutants associated with the at least one defect; identify a first metamorphic relationship of the one or more metamorphic relationships mapped to the first mutant; transmit, via the operative communication channel with the user device, a notification to the user indicating the at least one defect and the first metamorphic relationship; in response to a defect correction input from the user, initiate correction of the original program code by at least modifying code associated with a first process function of the one or more process functions of the original program, thereby constructing a corrected original program code; and perform defect analysis of the corrected original program code based on constructing a second mutated program.

In some embodiments, or in combination with any of the previous embodiments, constructing the one or more mutants by distorting the portion of the original program code further comprises: determining a first process function of the one or more process functions associated with the portion of the original program code; determining a first type of process function associated with the first process function; determining a second type of process function that is (i) associated with the first process function and (ii) structured to return a different output than the first type of process function; and constructing a first mutant of the one or more mutants such that the first mutant is associated with the second type of process function.

In some embodiments, or in combination with any of the previous embodiments, constructing the one or more mutants by distorting the portion of the original program code further comprises: determining a first process function of the one or more process functions associated with the portion of the original program code; analyzing first code associated with the first process function; and constructing a first mutant of the one or more mutants by introducing a predetermined error in the first code associated with the first process function, such that the first mutant is structured to return a different output than the first code associated with the first process function.

In some embodiments, or in combination with any of the previous embodiments, constructing the first mutant program based on embedding the one or more mutants in the original program code further comprises: constructing a replica of the original program code; and embedding the one or more mutants in the original program code by overwriting a portion of the replica of the original program code with at least one of the one or more mutants.

In some embodiments, or in combination with any of the previous embodiments,

In some embodiments, or in combination with any of the previous embodiments, constructing the first mutant program based on embedding the one or more mutants in the original program code further comprises: constructing a replica of the original program code; and embedding the one or more mutants in the original program code by inserting at least one of the one or more mutants at a predetermined location.

In some embodiments, or in combination with any of the previous embodiments, determining whether the original program comprises the at least one defect, further comprises determining a first divergence parameter between the original test output and the first mutated test output.

In some embodiments, or in combination with any of the previous embodiments, the system is further configured to: in response to comparing the original test output to the first mutated test output, construct a second mutated program; implement a third test on the original program, wherein the original program provides an updated original test output in response to the third test; implement a fourth test on the second mutated program, wherein the second mutated program provides a second mutated test output in response to the fourth test; and determine a second divergence parameter between the updated original test output and the mutated test output. In response to determining that a difference between the first divergence parameter and the second divergence parameter is below a predetermined threshold, the system may then: terminate the defect analysis of the original program; and transmit, via the operative communication channel with the user device, a notification to the user indicating completion of the defect analysis of the original program.

In some embodiments, or in combination with any of the previous embodiments, the first divergence parameter is associated with a difference in accuracy between the original test output and the first mutated test output.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
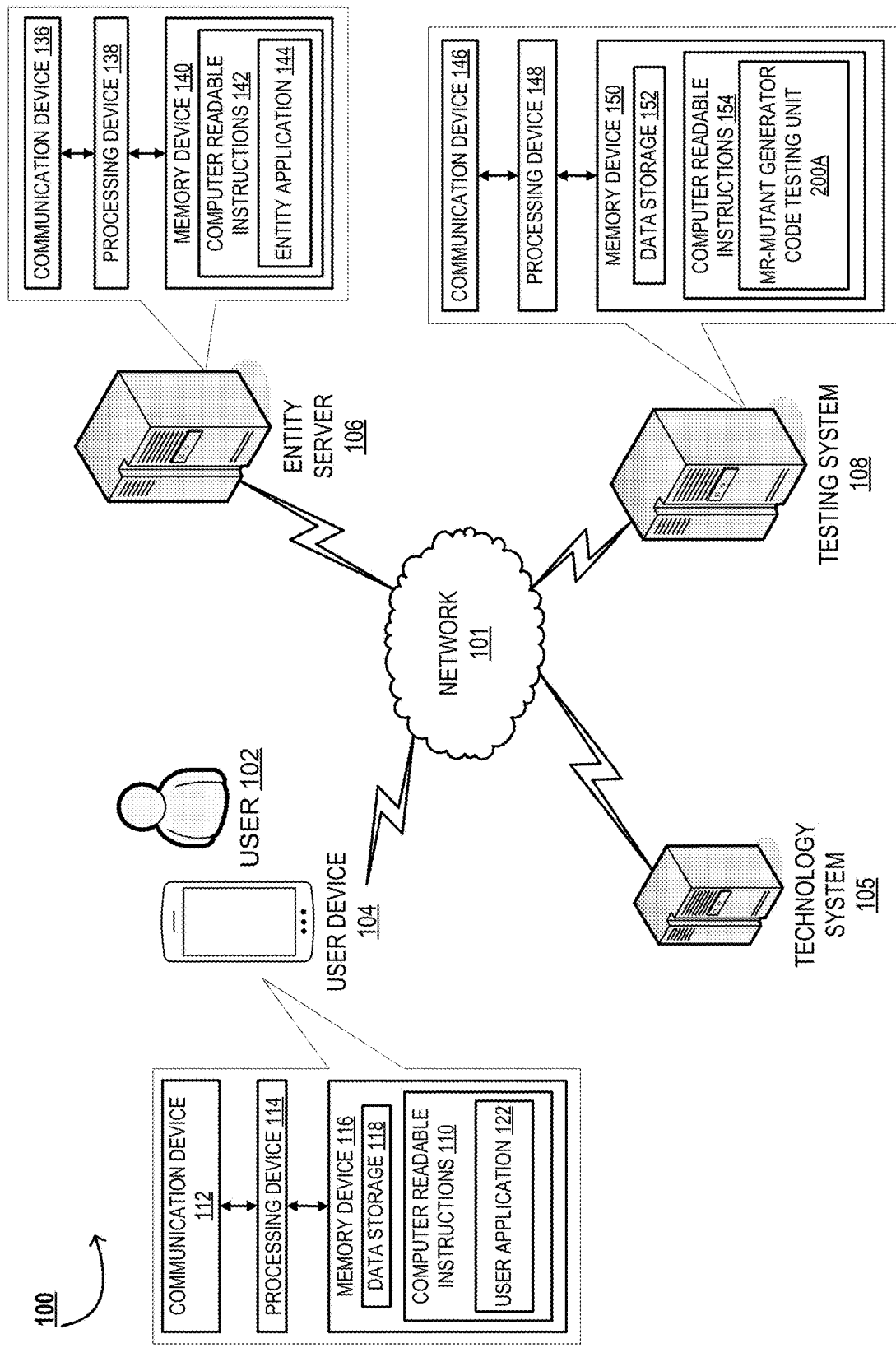
Figure 2A:
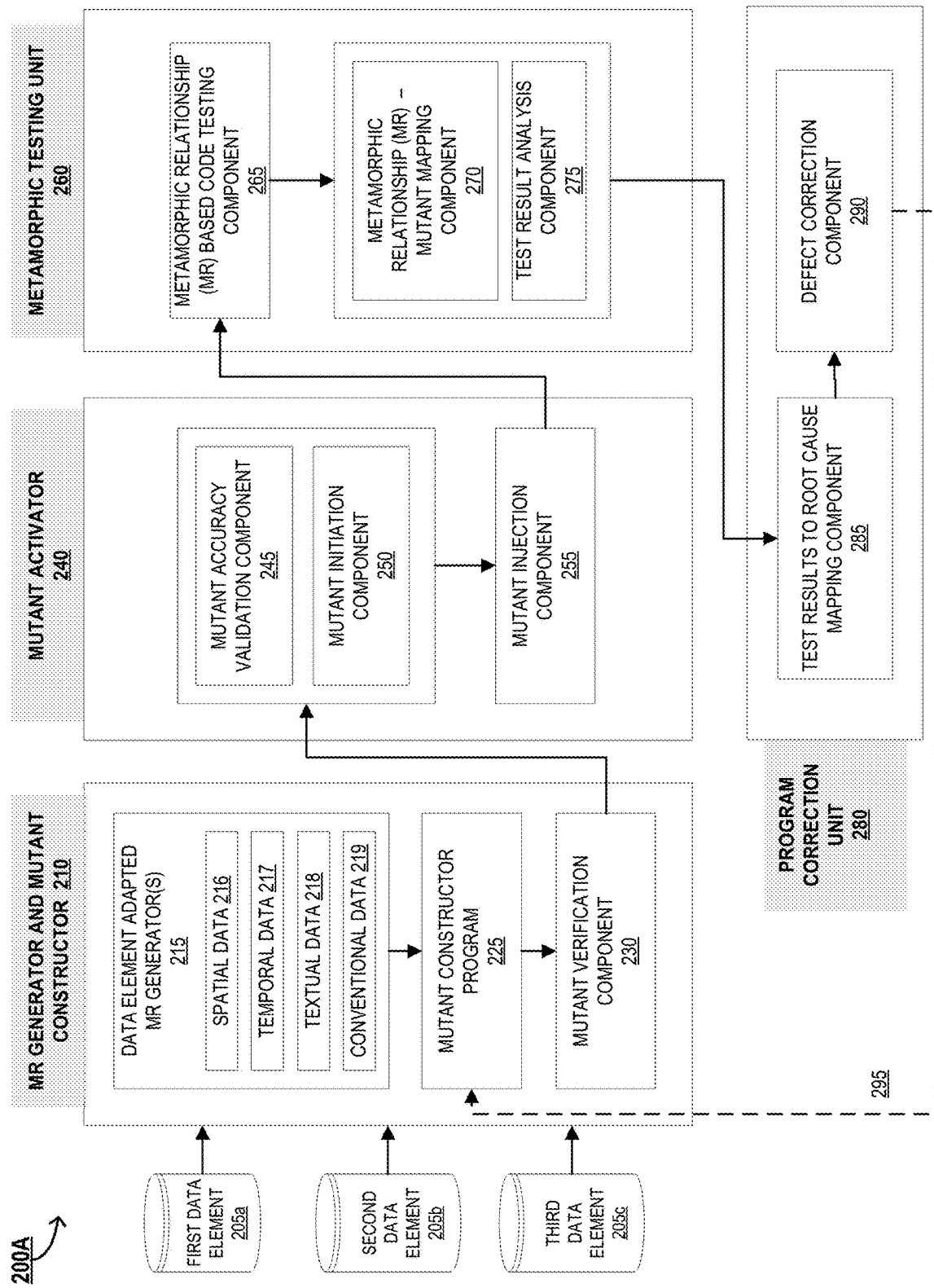
Figure 2B:
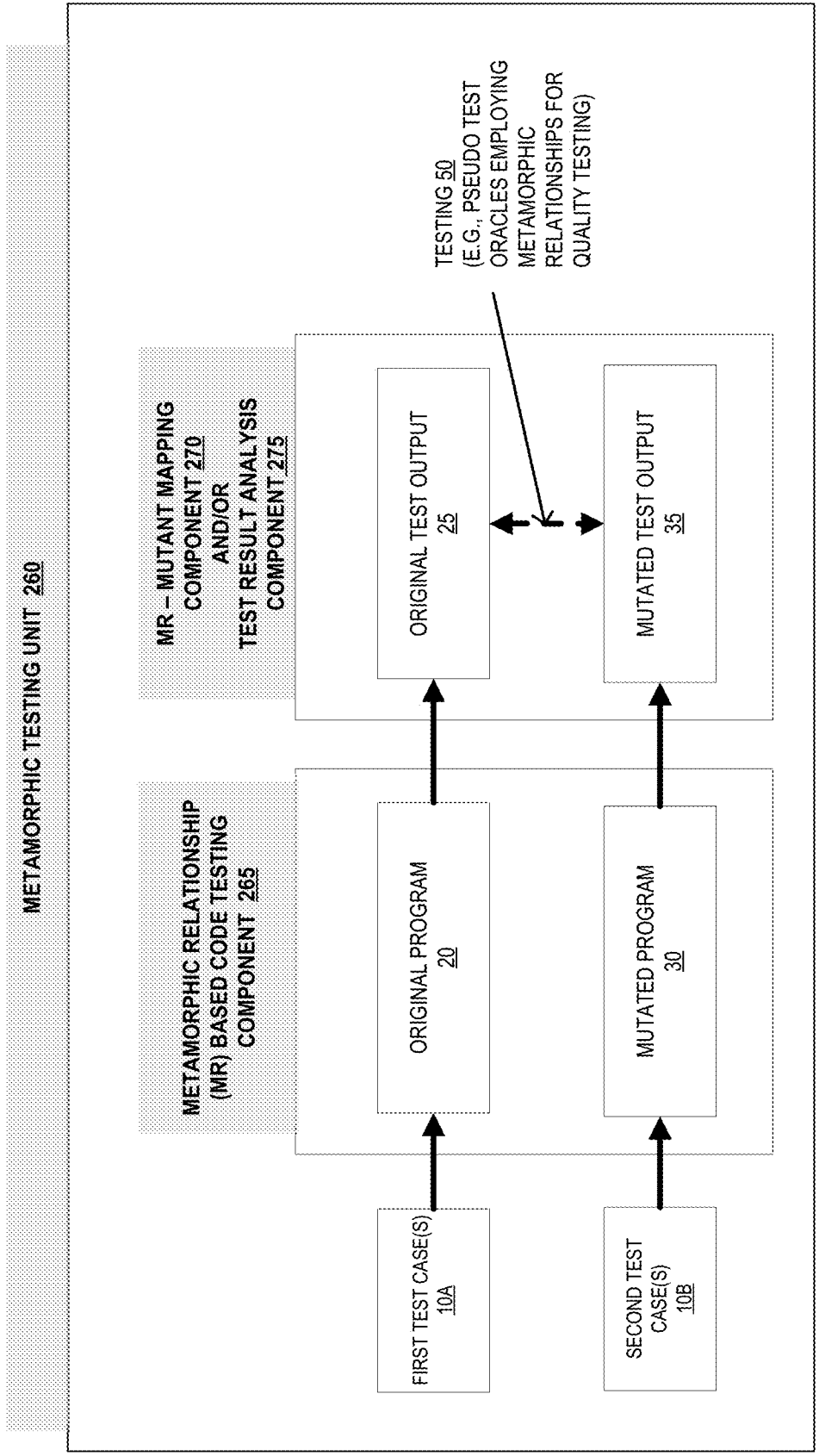
Figure 3:
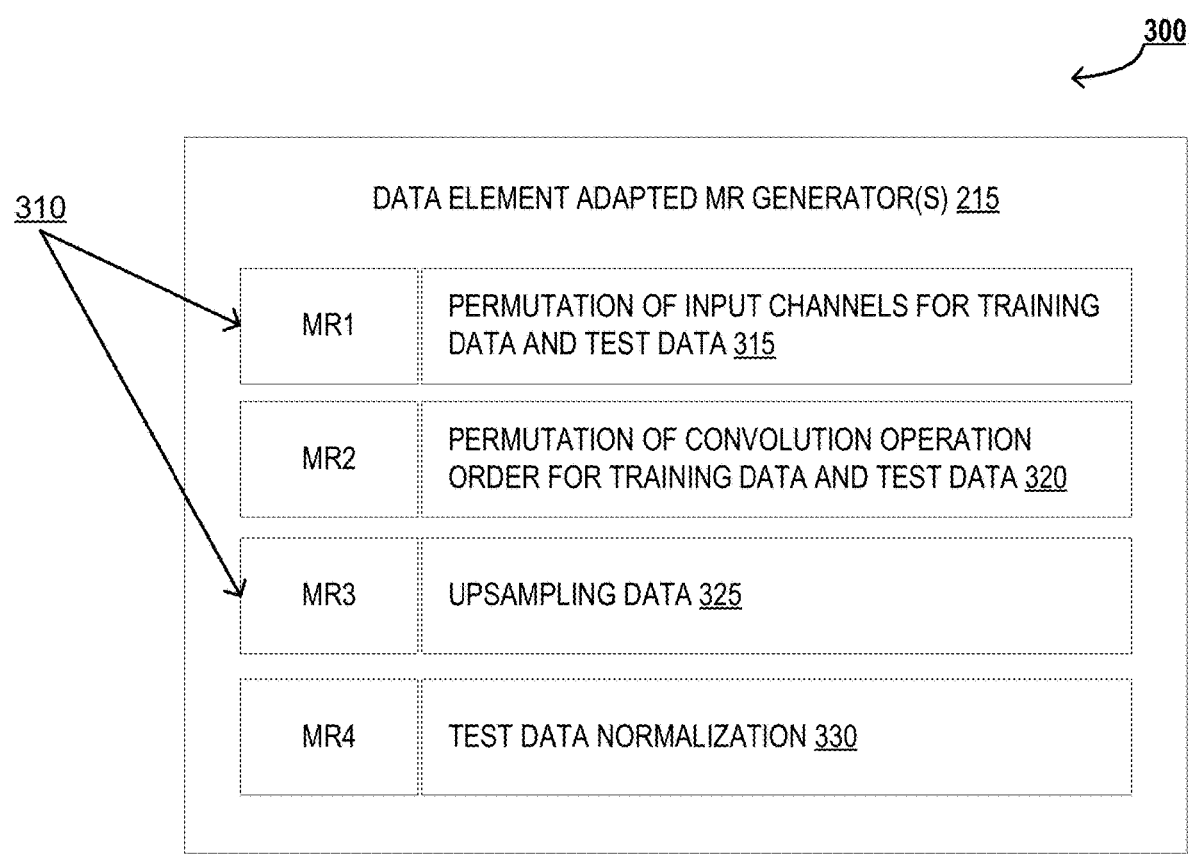
Figure 4:
Figure 5:
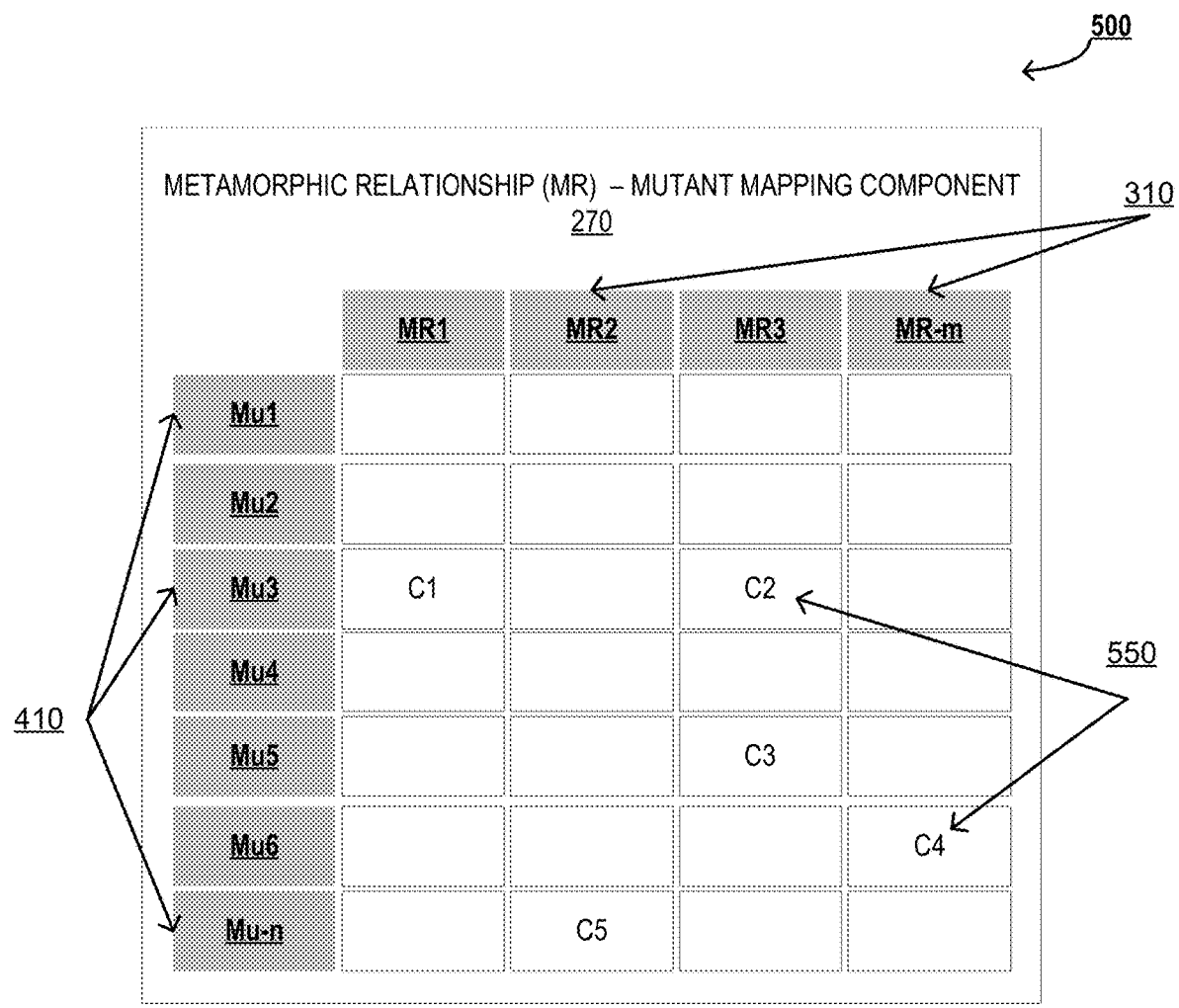
Figure 6:
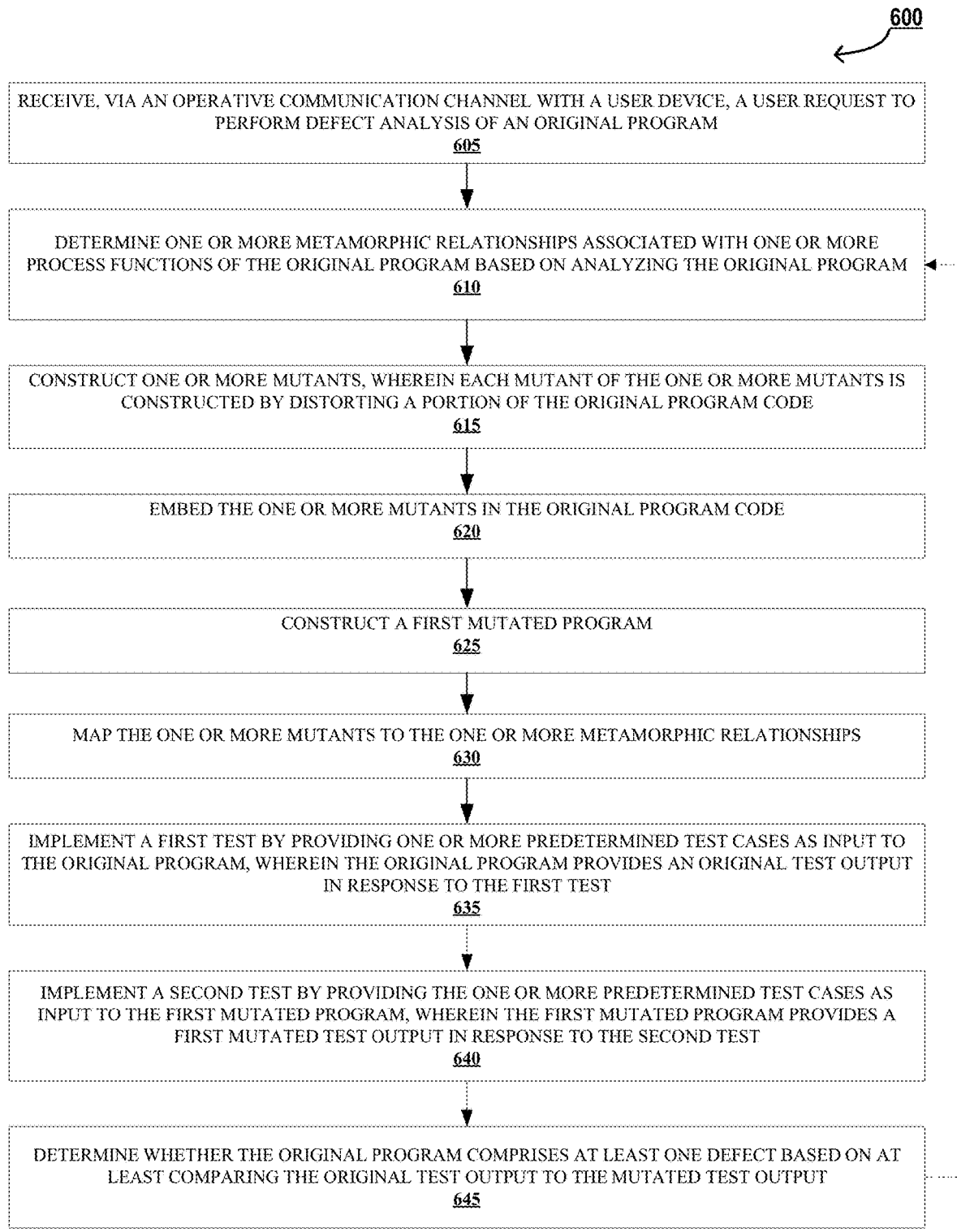

Having thus described embodiments of the invention in general terms, reference will now be made to the accompanying drawings, wherein:

FIG. 1 depicts a Metamorphic Relationship (MR) based code testing system environment 100, in accordance with one embodiment of the present invention;

FIG. 2A depicts a schematic representation of MR-Mutant generator code testing unit framework 200A, in accordance with one embodiment of the present invention;

FIG. 2B depicts a schematic representation of a metamorphic testing unit framework 200B, in accordance with one embodiment of the present invention;

FIG. 3 depicts a schematic representation 300 of illustrative examples of Metamorphic Relationships generated by Data Element Adapted MR Generators, in accordance with one embodiment of the present invention;

FIG. 4 depicts a schematic representation 400 of illustrative examples of Mutants constructed by a Mutant Constructor module, in accordance with one embodiment of the present invention;

FIG. 5 depicts a schematic representation 500 of illustrative examples of MR-Mutant mapping, in accordance with one embodiment of the present invention; and FIG. 6 depicts a high level process flow 600 for metamorphic relationship based code testing using mutant generators, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user information account associated with the user, or the like. The technology resource is typically associated with and/or maintained by an entity.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

As discussed previously, programs may comprise errors and defects, which if not identified and corrected in time may lead to malfunctioning of the program itself and/or other related programs and the devices that run them. Typically, a particular program may not be correct or may not be performing correctly in cases where the output provided by the program is unexpected or when the output is deficient or faulty.

However, in conventional systems, the testing of program code primarily relies on debugging code and/or data validation. This method typically relies on identifying an error (i.e., an absolute lapse or fault) in the output for even ascertaining that the particular program may not be correct or may not be performing correctly. However, in the instances of machine-learning programs or deep-learning programs, the output and/or the program code is seldom entirely erroneous (i.e., an absolute lapse or fault). Instead, the output and/or code may have low accuracy or lower than optimal accuracy. Here, conventional systems are not structured to identify that the output and/or code are exhibiting low accuracies, much less what functions in the program are causing these low accuracies.

Moreover, this conventional testing process, however, is not compatible for testing programs having complex structures such as machine-learning programs or deep-learning programs which have multiple layers of neural networks that do not lend themselves to the conventional methods of debugging. Second, as discussed, conventional methods are not configured for identifying root causes of inaccuracies, particularly in the case of machine-learning programs or deep-learning programs, thereby precluding any accurate/precise corrections of the program code to rectify the defects. Third, the conventional testing processes are heavily reliant on test cases for testing programs, and may not be able to identify defects when other use cases are provided to the program. Conventional testing methods are most likely to designate lack of model training data or test data as the cause for errors in machine-learning programs or deep-learning programs, even if the program code itself is erroneous (e.g., program code may comprise architectural configuration issues, interference state issues, or implementation issues, etc. that are causing the errors/inaccuracies in reality).

Particularly in the case of machine-learning programs or deep-learning programs, an error/bug cannot be determined in conventional testing systems through a few instances of inaccuracies during testing using test cases, because machine-learning programs or deep-learning programs are inherently constantly evolving (e.g., their accuracies improve over-time). Moreover, this conventional process while not being reliably accurate is also time intensive and laborious. Therefore, a need exists for a novel system that is configured for effective and systematic testing of the program code itself, identifying root causes of defects and remediating defects, which overcomes the foregoing shortcomings of conventional system.

The novel metamorphic relationship based code testing using mutant generators of the present invention (via a metamorphic relationship based code testing system environment 100 described below) overcomes the foregoing deficiencies of conventional testing systems and also provides additional advantages. Specifically, the present invention is configured for identifying and remediating defects in an original program based on constructing at least one mutated program by distorting the original program, and analyzing expression of mutants in test results. This unique metamorphic relationship based code testing system of the present invention is applicable to a variety of complex structured programs such as machine-learning programs or deep-learning programs. The present invention is not only configured for error identification but also for detecting defects in the form of inaccuracies, and also identifying and remediating root causes of these inaccuracies. Here, the present invention is structured to identify the precise architectural configuration issues, interference state issues, or implementation issues that may be causing the inaccuracies. The unique metamorphic relationship based code testing system of the present invention is able to identify defects even when other use cases are provided to the program. Indeed, typically, in the case of machine-learning programs or deep-learning programs, the test cases that are used to test the program in the present invention are distinct from the use/test cases utilized to train the program initially. The metamorphic relationship based code testing of the present invention is uniquely streamlined and effective for determining defects, root cause analysis and remediating the defects without undue processing time and without undue consumption of processing and memory resources. For instance, the mutated programs constructed during various iterations are stored in temporary memory locations that are easily accessible for compiling and running the program, which are then automatically purged after the particular iteration or after termination of testing, thereby providing effective use of processing and memory resources.

FIG. 1 illustrates a metamorphic relationship based code testing system environment 100, in accordance with some embodiments of the present invention. As illustrated in FIG. 1, a testing system 108 is in operative communication with and operatively coupled to, via a network 101, a user device 104, an entity server 106, and a technology system 105. In this way, the testing system 108 can send information to and receive information from the user device 104, the entity server 106, and the technology system 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, a MR-Mutant generator code testing unit 200A of the testing system 108, is configured for metamorphic relationship based code testing using mutant generators, and identifying and remediating defects in an original program based on constructing at least one mutated program by distorting the original program, and analyzing expression of mutants in test results. The MR-Mutant generator code testing unit 200A is also referred to as a MR-Mutant generator code testing program 200A herein, and is described in detail with respect to FIGS. 2A-2B later on.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

FIG. 1 also illustrates a user system 104. The user device 104 may be, for example, a desktop personal computer, a mobile system, such as a cellular phone, smart phone, personal data assistant (PDA), laptop, a server system, another computing system and/or the like. The user device 104 generally comprises a communication device 112, a processing device 114, and a memory device 116. The user device 104 is typically a computing system that is configured to enable user and device authentication for access to testing data results, request testing of programs, etc. The processing device 114 is operatively coupled to the communication device 112 and the memory device 116. The processing device 114 uses the communication device 112 to communicate with the network 101 and other devices on the network 101, such as, but not limited to, the entity server 106, the testing system 108 and the technology system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the testing system 108 and/or the entity system 106 are configured to cause the processing device 114 to execute the computer readable instructions 110, thereby causing the user device 104 to perform one or more functions described herein, for example, via the user application 122 and the associated user interface of the user application 122.

As further illustrated in FIG. 1, the testing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more programs, MR generator and mutant constructor module 210 (having data element adapted MR Generator(s) 215, Mutant Constructor program module 225 etc.), a Mutant activator module 240, a metamorphic testing unit 260 and/or program correction unit 280 of the MR-Mutant generator code testing unit 200A (illustrated in FIG. 2A), based on computer-readable instructions thereof, which may be stored in a memory device, for example, executing computer readable instructions 154 or computer-readable program code 154 stored in memory device 150 to perform one or more functions associated with a MR-Mutant generator code testing unit 200A The processing device 148 is operatively coupled to the communication device 146 and the memory device 150. The processing device 148 uses the communication device 146 to communicate with the network 101 and other devices on the network 101, such as, but not limited to the entity server 106, the technology system 105, and the user system 104. As such, the communication device 146 generally comprises a modem, server, or other device for communicating with other devices on the network 101.

As further illustrated in FIG. 1, the testing system 108 comprises the computer-readable instructions 154 stored in the memory device 150, which in one embodiment includes the computer-readable instructions 154 of the MR-Mutant generator code testing unit 200A. In some embodiments, the computer readable instructions 154 comprise executable instructions associated with the MR generator and mutant constructor module 210 (having data element adapted MR Generator(s) 215, Mutant Constructor program module 225 etc.), a Mutant activator module 240, a metamorphic testing unit 260 and/or program correction unit 280 of the MR-Mutant generator code testing unit 200A (illustrated in FIGS. 2A-2B), wherein these instructions, when executed, are typically configured to cause the applications or modules to perform/execute one or more steps described herein. In some embodiments, the memory device 150 includes data storage 152 for storing data related to the system environment, but not limited to data created and/or used by the MR-Mutant generator code testing unit 200A and its components/modules. In some embodiments, the memory device 150 includes temporary memory locations that are structured to be easily accessible for compiling and running the program. These locations may be employed for temporarily storing the mutated programs constructed during various iterations, which are then automatically purged after the particular iteration or after termination of testing, thereby providing effective use of processing and memory resources. The MR-Mutant generator code testing unit 200A is further configured to perform or cause other systems and devices to perform the various steps in testing of program code, as will be described in detail later on.

As such, the processing device 148 is configured to perform some or all of the metamorphic relationship based code testing using mutant generators steps described throughout this disclosure, for example, by executing the computer readable instructions 154. In this regard, the processing device 148 may perform one or more steps singularly and/or transmit control instructions that are configured to MR generator and mutant constructor module 210 (having data element adapted MR Generator(s) 215, Mutant Constructor program module 225 etc.), a Mutant activator module 240, a metamorphic testing unit 260 and/or program correction unit 280 of the MR-Mutant generator code testing unit 200A (illustrated in FIG. 2A), entity server 106, user device 104, and technology system 105 and/or other systems and applications, to perform one or more steps described throughout this disclosure. Although various testing steps may be described as being performed by the MR-Mutant generator code testing unit 200A and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the testing system 108 may include multiple systems, servers, computers or the like maintained by one or many entities. FIG. 1 merely illustrates one of those systems 108 that, typically, interacts with many other similar systems to form the information network. In one embodiment of the invention, the testing system 108 is operated by the entity associated with the entity server 106, while in another embodiment it is operated by a second entity that is a different or separate entity from the entity server 106. In some embodiments, the entity server 106 may be part of the testing system 108. Similarly, in some embodiments, the testing system 108 is part of the entity server 106. In other embodiments, the entity server 106 is distinct from the testing system 108.

In one embodiment of the testing system 108, the memory device 150 stores, but is not limited to, the MR-Mutant generator code testing unit 200A comprising MR generator and mutant constructor module 210 (having data element adapted MR Generator(s) 215, Mutant Constructor program module 225 etc.), a Mutant activator module 240, a metamorphic testing unit 260 and/or program correction unit 280, as will be described later on with respect to FIG. 2A. In one embodiment of the invention, the MR-Mutant generator code testing unit 200A may associated with computer-executable program code that instructs the processing device 148 to operate the network communication device 146 to perform certain communication functions involving the technology system 105, the user device 104 and/or the entity server 106, as described herein. In one embodiment, the computer-executable program code of an application associated with the MR-Mutant generator code testing unit 200A may also instruct the processing device 148 to perform certain logic, data processing, and data storing functions of the application.

The processing device 148 is configured to use the communication device 146 to receive data, receive requests for program testing, retrieve program code, transmit and/or cause display of outputs/test results and/or the like. In the embodiment illustrated in FIG. 1 and described throughout much of this specification, the MR-Mutant generator code testing unit 200A may perform one or more of the functions described herein, by the processing device 148 executing computer readable instructions 154 and/or executing computer readable instructions associated with one or more application(s)/devices/components of the MR-Mutant generator code testing unit 200A.

As illustrated in FIG. 1, the entity server 106 is connected to the testing system 108 and may be associated with a test case database, training database, etc. In this way, while only one entity server 106 is illustrated in FIG. 1, it is understood that multiple network systems may make up the system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the testing system 108. The testing system 108 may communicate with the entity server 106 via a secure connection generated for secure encrypted communications between the two systems for communicating data for processing across various applications.

As further illustrated in FIG. 1, in some embodiments, the technology event processing system environment 100 further comprises a technology system 105, in operative communication with the testing system 108, the entity server 106, and/or the user device 104. Typically, the technology system 105 comprises a communication device, a processing device and memory device with computer readable instructions. In some instances, the technology system 105 comprises a first database/repository comprising test cases, and/ or a second database/repository comprising training data (e.g., use/test cases earmarked for training the program (e.g., machine-learning program or another neural network program)). These applications/databases may be operated by the processor executing the computer readable instructions associated with the technology system 105, as described previously. In some instances, the technology system 105 is owned, operated or otherwise associated with third party entities, while in other instances, the technology system 105 is operated by the entity associated with the systems 108 and/or 106. Although a single external technology system 105 is illustrated, it should be understood that, the technology system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A illustrates the MR-Mutant generator code testing unit environment 200A for metamorphic relationship based code testing using mutant generators. The technology platform module is configured for identifying and remediating defects in an original program based on constructing at least one mutated program by distorting the original program, and analyzing expression of mutants in test results. In some embodiments, computer readable instructions 154, when executed by the processing device 148 of the testing system 108 (hereinafter referred to as "the system"), are typically configured to cause the modules, applications, and other components of the technology platform module environment 200A to perform one or more functions as described herein. The MR-Mutant generator code testing unit 200A typically comprises a MR generator and mutant constructor module 210, a mutant activator module 240, a metamorphic testing unit 260 and a program correction unit 280, in operative communication with each other. In some embodiments, the MR-Mutant generator code testing unit 200A and/or its components may be implemented in a Python 3.6 (MutPy) technology stack, e.g., for an original program associated with a Pytorch deep-learning processing platform.

In some embodiments, the term "module" or "unit" as used herein may refer to a functional assembly (e.g., packaged functional assembly) of one or more associated electronic components and/or one or more associated technology applications, programs, and/or codes. Moreover, in some instances, a "module" or "unit" together with the constituent electronic components and/or associated technology applications/programs/codes may be independently operable and/ or may form at least a part of the system architecture. In some embodiments, the term "module" or "unit" as used herein may refer to at least a section of a one or more associated technology applications, programs, and/or codes and/or one or more associated electronic components.

The MR-Mutant generator code testing unit 200A typically comprises the MR generator and mutant constructor module 210 comprising data element adapted MR Generator(s) 215, Mutant Constructor program module 225, etc., as also described in detail below, e.g., with respect to FIGS. 3-4. The MR generator and mutant constructor module 210 is typically in operative communication with one or more data sources (as indicated by first data element 205a, second data element 205b, and third data element 205c). The MR-Mutant generator code testing unit 200A typically receives, a user request to perform defect analysis of an original program. The data element adapted MR Generator(s) 215 typically retrieve original program code associated with the original program (e.g., from one or more data sources such as first data element 205a, second data element 205b, and/or third data element 205c). As illustrated, the MR Generator(s) 215 may comprise (i) a spatial data generator 216 for processing spatial data, (ii) temporal data generator 217 for processing temporal data, (iii) textual data generator 218 for processing textual data, and/or (iv) conventional data generator 219 for processing conventional data. The data element adapted MR Generator(s) 215 may determine one or more data types associated with one or more process functions of the original program and invoke only the applicable data generators, e.g., (i) spatial data type (e.g., images, image data, collection of pixels, etc.), (ii) temporal data type (e.g., time dependent data such as videos (time sequenced frames), etc.), (iii) textual data type (e.g., paragraphs, lines, alphanumeric text, etc.), and/or (iv) conventional data type (e.g., data associated with predictive processes such as weather forecasting, etc.). The system may adapt the MR Generator(s) 215 in accordance with the identified data type, and process the original program code using the corresponding generator(s) (216-219) that match the data type(s). Here, the MR Generator(s) 215 determine one or more metamorphic relationships associated with one or more process functions (e.g., a particular type of image processing) of the original program based on analyzing the original program.

Next, the system typically initiates construction of a first mutated program at the mutant constructor program 225. Here, the mutant constructor program 225 typically constructs one or more mutants. Typically, each mutant of the one or more mutants is constructed by distorting a portion of the original program code (e.g., such as those described with respect to FIGS. 3-4). The constructed mutants are verified at mutant verification component 230. Here, the system may receive verification and authorization from the user before commencing the subsequent steps.

The mutant activator module 240 comprises a mutant accuracy validation component 245 for testing the accuracy of the constructed mutants (e.g., whether the constructed mutants are structured to provide a different output than the corresponding portion of the original program code). The mutant activator module 240 then initiates the constructed and validated mutants at the mutant initiation component 255. The mutant activator module 240 then constructs the first mutant program based on embedding the one or more mutants in the original program code at the mutant injection component 255. Here, the system may construct a replica of the original program code, and embed the one or more mutants in the original program code by inserting or overwriting at least one of the one or more mutants at a predetermined location.

FIG. 2A further illustrates a metamorphic testing unit 260 in operative communication with the mutant activator module 240. The system typically maps the one or more mutants to the one or more metamorphic relationships. During the testing process at the metamorphic relationship (MR) based code testing component 265, the system implements a first test by providing one or more predetermined test cases as input to the original program. As a result of the first test the original program may provide an original test output. Moreover, the system implements a second test by providing the one or more predetermined test cases (same test cases provided to the first test) as input to the first mutated program. Subsequently, the first mutated program provides a first mutated test output in response to the second test. The system then analyzes the outputs at a test result analysis component 275 in conjunction with MR-mutant mapping previously performed at MR-Mutant mapping component 270. In this way the system determines whether the original program comprises at least one defect based on at least comparing the original test output to the mutated test output. In some embodiments, or in combination with any of the previous embodiments, determining whether the original program comprises the at least one defect, further comprises determining whether the original test output matches the mutated test output; and determining that the original program comprises the at least one defect based on at least determining that the original test output matches the mutated test output. The features and functions of the metamorphic testing unit 260 will also be described with respect to FIG. 2B, below.

FIG. 2A further illustrates a program correction unit 280 in operative communication with the metamorphic testing unit 260. Here, the system determines the root causes, i.e., portions of the original program code or the functional areas of the code that are the causes of the defects (i.e., inaccuracies), at test results to root cause mapping component 285. For instance, the system determines whether the defects are being caused by architectural configuration issues, interference state issues, or implementation issues, etc. of the original program and the associated process functions. At the defect correction component 290, the system may modify the original program to correct the defects. In some embodiments, next, the control may flow back to the mutant construct program 225, as indicated by arrow 295, for further iterations of testing, for further improvement in accuracies, and/or for testing additional portions/process functions of the original program.

FIG. 2B depicts a schematic representation of a metamorphic testing unit framework 200B associated with the metamorphic testing unit 260 of FIG. 2A, in accordance with one embodiment of the present invention. As discussed previously, the system, i.e., the MR-Mutant generator code testing unit 200A, may receive a user request to perform defect analysis of a particular original program 20. The system may then determine one or more metamorphic relationships associated with one or more process functions of the original program 20 based on analyzing the original program 20 (e.g., via the data element adapted MR Generator(s) 215 of FIG. 2A). Next, the system may construct a mutated program 30 for testing of the original program 20 (e.g., via the mutant constructor program 225 of FIG. 2A), such as, based on constructing one or more mutants by distorting a portion of the original program code and subsequently embedding the one or more mutants in the original program code. The system, may also map the one or more mutants to the one or more metamorphic relationships, as discussed (e.g., via the MR—mutant mapping component 270 of FIGS. 2A-2B).

Next, the system is configured to implement metamorphic testing of the original program 20, code via the metamorphic testing unit 260, as illustrated by FIG. 2B. The system, e.g., via the metamorphic testing unit 260, may determine one or more test cases for testing the original program 20, such as one or more first test cases 10A and one or more second test cases 10B. In some embodiments, the one or more first test cases 10A and the one or more second test cases 10B are substantially identical and/or interchangeable, while in other embodiments they may be different. During the testing process, the metamorphic relationship (MR) based code testing component 265 may then run/execute or implement running/execution of the original program 20 and the mutated program 30 for testing. Here, the MR based code testing component 265 may implement a first test by providing the one or more first test cases 10A (or one or more second test cases 10B) as input to the original program 20. Also, the MR based code testing component 265 may implement a second test by providing the one or more second test cases 10B (or one or more first test cases 10A) as input to the mutated program 30.

Based on the first test, the original program typically returns/provides an original test output 25 in response to the first test, which is typically transmitted to the test result analysis component 275 for analysis. In addition, the mutated program 30 returns/provides a mutated test output 35 in response to the second test, which is also typically transmitted to the test result analysis component 275 for analysis. Subsequently, the test result analysis component 275 in conjunction with the MR—mutant mapping component 270 determines whether the original program 20 comprises at least one defect, e.g., based on at least comparing the original test output 25 to the mutated test output 35. In particular, the test result analysis component 275 analyzes the outputs in conjunction with the MR-mutant mapping previously performed at MR-Mutant mapping component 270. At block 50, the test result analysis component 275 may determine that the original program comprises the at least one defect based on at least determining that the original test output matches the mutated test output, and identifying any applicable root causes, e.g., based on pseudo test oracles employing metamorphic relationships for quality testing.

FIG. 3 depicts a schematic representation 300 of non-limiting illustrative examples of metamorphic relationships generated by the data element adapted MR Generators 215, in accordance with one embodiment of the present invention. Metamorphic relationships are derived from the innate characteristics of the original program code. In some embodiments, metamorphic relationships refer to relations among multiple executions of the target program. In some embodiments, the system generates metamorphic relationship such that, for the original program, the metamorphic relationship is property of its target process function.

Specifically, illustrative, non-limiting examples of one or more metamorphic relationships 310 generated by the spatial data generator 216 are illustrated for an instance where the original program is generally an image processing machine/deep learning program. Here, the original program may be associated with one or more process functions, each being related to a metamorphic relationship associated with one or more image processing functions. In this regard, the one or more metamorphic relationships 310 may comprise a first metamorphic relationship (MR1) of permutation of input channels for training data and test data 315, a second metamorphic relationship (MR2) of permutation of convolution operation order for training data and test data 320, a third metamorphic relationship (MR3) of upsampling data 325, and a fourth metamorphic relationship (MR4) of test data normalization 330.

The first metamorphic relationship (MR1) of permutation of input channels for training data is structured for permutation of or modification of image channels such as RGB channels. Moreover, convolution is associated with image processing machine learning programs. Here, not all pixels in an image are critical for image identification. Convolution is employed in order to ascertain the specific identifying features of the image. In this regard, the second metamorphic relationship (MR2) of permutation of convolution operation order for training data and test data 320 maybe determined to be a metamorphic relationship associated with the process function of convolution by the system.

Moreover, in object detection type process functions of the original program image data may require to be encoded and decoded. Here, only the aforementioned critical or identifying features/portions of the image may be encoded (the rest may be discarded). After subsequent decoding after one or more steps in-between, the original program may be structured to generate the remaining portions/pixels. In this regard, the system (e.g., via the spatial data generator 216) may the third metamorphic relationship (MR3) of upsampling data 325 associated with the object detection type process functions.

Moreover, in machine learning model training type process functions (e.g., for facial recognition), training images (training data/cases) may be used to train the original program. However, these training images may each comprise different resolutions, dimensions, etc., that need to be standardized before training can be performed. Here, the system (e.g., via the spatial data generator 216) may determine the fourth metamorphic relationship (MR4) of test data normalization 330 for achieving the normalization of resolutions, dimensions, etc.

FIG. 4 depicts a schematic representation 400 of non-limiting illustrative examples of one or more mutants 410 constructed by the mutant constructor module 225, in accordance with one embodiment of the present invention. The system localizes the areas or the program that are likely causing inaccuracies (i.e., defects) and distort those specific areas. Following the illustrative example of FIG. 3 for an image processing machine-learning type original program, examples of one or more mutants 410 related to the spatial data type and corresponding the one or more metamorphic relationships 310 of FIG. 3, and the number of each required to be embedded 415, are illustrated. In this regard, the one or more mutants 410 may comprise four change loss function mutants 415, two change architecture of imagenet mutants 420, and two changes to learning rate decay mutants 425.

In some embodiments, in machine-learning image processing and classification, minimized objective functions or loss functions may represent how well the program predicts the expected outcome in comparison with the ground truth, i.e., the cost/value of inaccuracy of predictions (problems of identifying which category a particular image belongs to). These loss functions help the machine-learning program learn from incorrect/inaccurate outputs. Loss functions may me of various types such as classification loss function type, regression loss function type, etc. The system may construct a first mutant 415 by changing the loss function. For example, the system may determine that the original program comprises one or more "Sigmoid" loss functions. The system may further determine that sigmoid loss functions are non-linear type loss functions. The system may construct the first mutant 415 to be a "Softmax" loss function (to replace/distort the sigmoid loss function to test its performance) which the system determined to be a normalized exponential function type. The system may further determine that 4 such Softmax type mutants are required to me embedded into the original program code to construct the mutated program code.

Similarly, the system may construct two second mutants 420 by changing an architecture of image net. Moreover, the system may construct two third mutants 425 by changing/distorting a learning rate decay of the original program.

FIG. 5 depicts a schematic representation 500 of non-limiting illustrative examples of MR-Mutant mapping, in accordance with one embodiment of the present invention.

Specifically, examples of one or more metamorphic relationships 310 (MR1-MR-m) and corresponding one or more mutants 410 (Mu1-Mu-n), and mapping 550 (C1-C5) between them is illustrated, as performed by the system. For instance, Mutant Mu3 is mapped to metamorphic relationships MR1 and MR3, Mutant Mu5 is mapped to metamorphic relationship MR3, Mutant Mu6 is mapped to metamorphic relationship MR-m, and Mutant Mu-n is mapped to metamorphic relationship MR1 and MR2.

For example, Mutant M3 may be a Softmax type loss function (changed from a Sigmoid loss function, as described in the example in FIG. 4). The system connects (i.e., maps/constructs a pointer from) the Softmax type loss function Mutant M3 with (i) metamorphic relationship MR1 of permutation of input channels for training data and test data 315 (described with respect to the example in FIG. 3) and with (ii) metamorphic relationship MR3 of upsampling data 325 (described with respect to the example in FIG. 3), based on determining that the distortion(s) introduced by the Mutant M3 should affect (positively or adversely by at least a predetermined amount of accuracy or in a predetermined manner) the metamorphic relationships MR1 and MR3. Similarly, the system maps all of the one or more mutants with their respective metamorphic relationships.

FIG. 6 illustrates a high level process flow 600 for metamorphic relationship based code testing using mutant generators, in accordance with one embodiment of the present invention. One or more steps described with respect to the high level process flow 600 may be performed by the system 108 and/or more specifically, the MR-Mutant Generator code testing unit 200A. Through the process flow 600 the system 108 and/or more specifically, the MR-Mutant Generator code testing unit 200A are configured for identifying and remediating defects in an original program based on constructing at least one mutated program by distorting the original program, and analyzing expression of mutants in test results, particularly in the instances where the original program is a machine-learning model program or a deep-learning model program.

As illustrated by block 605, the system, i.e., the MR-Mutant generator code testing unit 200A receives, via an operative communication channel with a user device 104, a user request to perform defect analysis of an original program. Here, the user may provide the requisite authorization and permissions for access to and modification of the original program. At the commencement of the metamorphic testing, the system, e.g., via the data element adapted MR Generator(s) 215, typically determines one or more metamorphic relationships associated with one or more process functions of the original program based on analyzing the original program, as indicated by block 610. These metamorphic relationships may be similar to those described with respect to the examples in FIG. 3. Metamorphic relationships are derived from the innate characteristics of the original program code. In some embodiments, metamorphic relationships refer to relations among multiple executions of the target program. In some embodiments, the system generates metamorphic relationship such that, for the original program, the metamorphic relationship is property of its target process function.

Next, the system, via the mutant constructor program 225, is configured to construct a mutated program for testing of the original program. As indicated by block 615, the system is configured to construct one or more mutants. Here, each mutant of the one or more mutants is constructed by distorting a portion of the original program code, e.g., similar to that described with respect to FIG. 4.

A first method of distorting the original program to construct the mutant(s) is described below. In some embodiments, the system may first determine a first process function (e.g., various image processing functions, object recognition, machine learning training, etc.) of the one or more process functions associated with the portion of the original program code. The system may then determine a first type of process function (e.g., loss function of a first type such as Sigmoid) associated with the first process function. Subsequently, the system may determine a second type of process function (e.g., a loss function of a second type such as Softmax) that is (i) associated with the first process function (i.e., loss functions) and (ii) structured to return a different output than the first type of process function (return a different output via the associated metamorphic relationship(s) due to its different efficiency and normalized exponential nature). The system may then construct a first mutant of the one or more mutants such that the first mutant is associated with the second type of process function. These steps may be repeated appropriately until the required mutants are constructed.

A second method of distorting the original program to construct the mutant(s) is described below. Here, in some embodiments, the system may first determine a first process function of the one or more process functions associated with the portion of the original program code. The system may then analyze first code associated with the first process function within the code of the original program. Next, the system may construct the first mutant of the one or more mutants by introducing a predetermined error (i.e., distortion) in the first code associated with the first process function, such that the first mutant is structured to return a different output than the first code associated with the first process function (return a different output via the associated metamorphic relationship(s)). Here, in some embodiments, the error introduced by the mutant may either undermine the first code associated with the first process function, render the first code ineffective, or improve the first code associated with the first process function.

The system may choose the first method of distorting the original program, the second method of distorting the original program, or combine first and second methods based on the type of mutant to be constructed and/or the process function or metamorphic relationship to be tested for the particular embodiment.

In addition, the system is configured to embed the one or more mutants in the original program code (e.g., into a replica of the original program code stored at a different memory location), as indicated by block 620. Here, the system may first construct a replica of the original program code. In some embodiments, the system may embed the one or more mutants in the original program code by overwriting a portion of the replica of the original program code with at least one of the one or more mutants (e.g., in the case of a mutant associated with converting the type of process function/code, or introducing an error by modifying one or more lines in the code, etc.). In some embodiments, the system may embed the one or more mutants in the original program code by inserting at least one of the one or more mutants at a predetermined location of the replica of the original program code (e.g., in the case of a mutant where new lines, sections or portions of code are introduced). In this manner the system is able to construct a first mutated program, as indicated by block 625.

The system, e.g., via the MR—mutant mapping component 270, may then map the one or more mutants to the one or more metamorphic relationships, as indicated by block 630. This process is typically similar to that described with respect to FIG. 5.

Next, the system is configured to implement a first test by running/executing the original program, and providing one or more predetermined test cases as input to the original program, wherein the original program provides an original test output in response to the first test, as illustrated by block 635. As illustrated by block 640, the further implements a second test by running/executing the first mutated program, and providing the one or more predetermined test cases as input to the first mutated program, wherein the first mutated program provides a first mutated test output in response to the second test. In this way, testing of the original program is performed, in a manner similar to that described with respect to FIG. 2B.

Subsequently, as indicated by block 645, the system is configured to determine whether the original program comprises at least one defect based on at least comparing the original test output to the mutated test output. Here, typically, the system analyzes the outputs to determine whether the original test output matches the mutated test output. In response, the system may determine that the original program comprises the at least one defect based on at least determining that the original test output matches (or substantially matches) the mutated test output. For instance, in the case of image processing machine-learning type original program, the system may determine the first accuracy provided by the original program as the original test output. The system may determine the second accuracy provide by the second program as the mutated test output. Based on determining that the first accuracy is identical to the second accuracy, the system may infer (i) that the associated inserted mutant has been neutralized due to a remnant defect on the code (e.g., that compensates for the distortion provided by the mutant), and/or (ii) that the process function that the mutant is distorting is ineffective/inefficient in the first place such that its distortion does not cause major changes to the output.

Conversely, the system may determine that the original program does not comprise the at least one defect based on at least determining that the original test output deviates from, i.e., does not match the first mutated test output. Here, differences in outputs are justifiable due to the distortions and can be traced back to the inserted mutants.

Because typically there may be multiple mutants embedded to form the mutated program, the system may analyzed the outputs to identify markers of active mutants (i.e., mutants whose effect is evident in the output). Moreover, the system may perform the process steps 610-645 over several iterations (plurality of iterations) until an equilibrium is attained between the $n^{th}$ iteration and the $(n+1)^{th}$ iteration. In this regard, at the end of each iteration, e.g., at block 645, the system may determine a divergence parameter divergence parameter between the original test output and the associated mutated test output.

For instance, for the test pair of the first test on the original program and the second test on the first mutated program described above, the system may determine a first divergence parameter between the original test output and the first mutated test output (e.g., a difference in accuracies of the outputs). Based on determining that the test outputs are substantially same and that a defect exists, the system may proceed to root cause analysis and defect correction by program correction unit 280. The system may then perform a first correction of the original program. The system may proceed to the next iteration of testing back to block 645 to determine whether the first correction has remediated the defects.

Here, during the second iteration, the system may construct a second mutated program, in accordance with blocks 610-630. The system may then implement a third test on the original program where the original program provides an updated original test output (e.g., using same or different test cases from the previous iteration). Also, the system may implement a fourth test on the second mutated program where the second mutated program provides a second mutated test output. The system may determine a second divergence parameter between the updated original test output and the mutated test output.

In response to determining that a difference between the first divergence parameter ($n^{th}$ iteration) and the second divergence parameter (($n+1)^{th}$ iteration) is below a predetermined threshold, the system may determine that equilibrium is attained and the defect is corrected/resolved. In response to determining that equilibrium has been attained, the system may terminate the for defect analysis of the original program, and transmit, via the operative communication channel with the user device, a notification to the user indicating completion of the defect analysis of the original program. It is noted that, although described with respect to two iterations, in some embodiments, the testing may involve 3, 5, 20, 50, 100, 200, 200-300 iterations, etc., until equilibrium is attained. Conversely, in response to determining that difference between the first divergence parameter ($n^{th}$ iteration) and the second divergence parameter (($n+1)^{th}$ iteration) is not below a predetermined threshold, the system may proceed to a third iteration in a similar manner, and continue until equilibrium is attained.

The steps of defect correction in accordance with some embodiments of the invention. Typically, in response to determining that the original program comprises the at least one defect, e.g., at block 645, the system may determine a first mutant of the one or more mutants associated with the at least one defect (e.g., the process function that the mutant is distorting that is likely defective). The system may then identify a first metamorphic relationship of the one or more metamorphic relationships that are mapped to the first mutant (e.g., as described with respect to FIG. 5) (reverse map). The system may transmit, via the operative communication channel with the user device, a notification to the user indicating the at least one defect and the first metamorphic relationship. Moreover, in response to a defect correction input from the user, the system may initiate correction of the original program code by at least modifying code associated with a first process function of the one or more process functions of the original program, thereby constructing a corrected original program code. The system may then proceed to the next iteration by performing defect analysis of the corrected original program code based on constructing a second mutated program.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for metamorphic relationship based code testing using mutant generators, wherein the system is configured for identifying and remediating defects in an original program based on constructing at least one mutated program by distorting the original program, and analyzing expression of mutants in test results, the system comprising:
   at least one memory device with computer-readable program code stored thereon;
   at least one communication device; and
   at least one processing device operatively coupled to the at least one memory device and the at least one communication device, wherein executing the computer-readable code is configured to cause the at least one processing device to:
      receive a request to perform defect analysis of an original program;
      retrieve original program code associated with the original program;
      determine one or more metamorphic relationships associated with one or more process functions of the original program based on analyzing the original program;
      construct a first mutated program, wherein constructing the first mutated program comprises constructing one or more mutants, wherein each mutant of the one or more mutants is constructed by distorting a portion of the original program code;
      map the one or more mutants to the one or more metamorphic relationships;
      implement a first test of the original program, wherein the original program provides an original test output in response to the first test;
      implement a second test of the first mutated program, wherein the first mutated program provides a first mutated test output in response to the second test;
      determine whether the original program comprises at least one defect based on at least comparing the original test output to the first mutated test output;
      in response to determining that the original program comprises the at least one defect, determine a first mutant of the one or more mutants associated with the at least one defect;
      identify a first metamorphic relationship of the one or more metamorphic relationships mapped to the first mutant;
      transmit, via the operative communication channel, a notification indicating the at least one defect and the first metamorphic relationship; and
      in response to a defect correction input, initiate correction of the original program code by at least modifying code associated with a first process function of the one or more process functions of the original program, thereby constructing a corrected original program code.

2. The system of claim 1, wherein determining whether the original program comprises the at least one defect, further comprises:
   determining whether the original test output matches the first mutated test output; and
   determining that the original program comprises the at least one defect based on at least determining that the original test output matches the first mutated test output.

3. The system of claim 1, wherein determining whether the original program comprises the at least one defect, further comprises:
   determining whether the original test output matches the first mutated test output; and
   determining that the original program does not comprise the at least one defect based on at least determining that the original test output does not match the first mutated test output.

4. The system of claim 1, wherein the original program is a machine learning model program or a deep learning model program.

5. The system of claim 1, wherein executing the computer-readable code is configured to cause the at least one processing device to perform defect analysis of the corrected original program code based on constructing a second mutated program.

6. The system of claim 1, wherein constructing the one or more mutants by distorting the portion of the original program code further comprises:
   determining a first process function of the one or more process functions associated with the portion of the original program code;
   determining a first type of process function associated with the first process function;
   determining a second type of process function that is (i) associated with the first process function and (ii) structured to return a different output than the first type of process function; and
   constructing a first mutant of the one or more mutants such that the first mutant is associated with the second type of process function.

7. The system of claim 1, wherein constructing the one or more mutants by distorting the portion of the original program code further comprises:
   determining a first process function of the one or more process functions associated with the portion of the original program code;

analyzing first code associated with the first process function; and constructing a first mutant of the one or more mutants by introducing a predetermined error in the first code associated with the first process function, such that the first mutant is structured to return a different output than the first code associated with the first process function.

8. The system of claim 1, wherein constructing the first mutant program based on embedding the one or more mutants in the original program code further comprises:

constructing a replica of the original program code; and embedding the one or more mutants in the original program code by overwriting a portion of the replica of the original program code with at least one of the one or more mutants.

9. The system of claim 1, wherein constructing the first mutant program based on embedding the one or more mutants in the original program code further comprises:

constructing a replica of the original program code; and embedding the one or more mutants in the original program code by inserting at least one of the one or more mutants at a predetermined location.

10. The system of claim 1, wherein determining whether the original program comprises the at least one defect, further comprises determining a first divergence parameter between the original test output and the first mutated test output.

11. The system of claim 10, wherein executing the computer-readable code is configured to cause the at least one processing device to:

in response to comparing the original test output to the first mutated test output, construct a second mutated program;

implement a third test on the original program, wherein the original program provides an updated original test output in response to the third test;

implement a fourth test on the second mutated program, wherein the second mutated program provides a second mutated test output in response to the fourth test;

determine a second divergence parameter between the updated original test output and the mutated test output; and in response to determining that a difference between the first divergence parameter and the second divergence parameter is below a predetermined threshold:
terminate the defect analysis of the original program; and
transmit a notification indicating completion of the defect analysis of the original program.

12. The system of claim 10, wherein the first divergence parameter is associated with a difference in accuracy between the original test output and the first mutated test output.

13. A computer program product for metamorphic relationship based code testing using mutant generators, wherein the computer program product is configured for identifying and remediating defects in an original program based on constructing at least one mutated program by distorting the original program, and analyzing expression of mutants in test results, the computer program product comprising a non-transitory computer-readable storage medium having computer-executable instructions to:

receive, a request to perform defect analysis of an original program;

retrieve original program code associated with the original program;

determine one or more metamorphic relationships associated with one or more process functions of the original program based on analyzing the original program;

construct a first mutated program, wherein constructing the first mutated program comprises constructing one or more mutants, wherein each mutant of the one or more mutants is constructed by distorting a portion of the original program code;

map the one or more mutants to the one or more metamorphic relationships;

implement a first test of the original program, wherein the original program provides an original test output in response to the first test;

implement a second test of the first mutated program, wherein the first mutated program provides a first mutated test output in response to the second test;

determine whether the original program comprises at least one defect based on at least comparing the original test output to the first mutated test output;

in response to determining that the original program comprises the at least one defect, determine a first mutant of the one or more mutants associated with the at least one defect;

identify a first metamorphic relationship of the one or more metamorphic relationships mapped to the first mutant;

transmit, via the operative communication channel, a notification indicating the at least one defect and the first metamorphic relationship; and in response to a defect correction input, initiate correction of the original program code by at least modifying code associated with a first process function of the one or more process functions of the original program, thereby constructing a corrected original program code.

14. The computer program product of claim 13, wherein determining whether the original program comprises the at least one defect, further comprises:

determining whether the original test output matches the mutated test output; and determining that the original program comprises the at least one defect based on at least determining that the original test output matches the mutated test output.

15. The computer program product of claim 13, wherein determining whether the original program comprises the at least one defect, further comprises:

determining whether the original test output matches the first mutated test output; and determining that the original program does not comprise the at least one defect based on at least determining that the original test output does not match the first mutated test output.

16. The computer program product of claim 13, wherein the non-transitory computer-readable storage further comprises computer-executable instructions to perform defect analysis of the corrected original program code based on constructing a second mutated program.

17. A method for metamorphic relationship based code testing using mutant generators, wherein the method is configured for identifying and remediating defects in an original program based on constructing at least one mutated program by distorting the original program, and analyzing expression of mutants in test results, the method comprising:

receiving, a request to perform defect analysis of an original program;

retrieving original program code associated with the original program;

determining one or more metamorphic relationships associated with one or more process functions of the original program based on analyzing the original program;

constructing a first mutated program, wherein constructing the first mutated program comprises constructing one or more mutants, wherein each mutant of the one or more mutants is constructed by distorting a portion of the original program code;

map the one or more mutants to the one or more metamorphic relationships;

implementing a first test of the original program, wherein the original program provides an original test output in response to the first test;

implementing a second test of the first mutated program, wherein the first mutated program provides a first mutated test output in response to the second test;

determining whether the original program comprises at least one defect based on at least comparing the original test output to the mutated test output;

in response to determining that the original program comprises the at least one defect, determine a first mutant of the one or more mutants associated with the at least one defect;

identifying a first metamorphic relationship of the one or more metamorphic relationships mapped to the first mutant;

transmitting, via the operative communication channel, a notification indicating the at least one defect and the first metamorphic relationship; and in response to a defect correction input, initiate correction of the original program code by at least modifying code associated with a first process function of the one or more process functions of the original program, thereby constructing a corrected original program code.

18. The method of claim 17, wherein determining whether the original program comprises the at least one defect, further comprises:

determining whether the original test output matches the mutated test output; and determining that the original program comprises the at least one defect based on at least determining that the original test output matches the mutated test output.

19. The method of claim 17, wherein determining whether the original program comprises the at least one defect, further comprises:

determining whether the original test output matches the first mutated test output; and determining that the original program does not comprise the at least one defect based on at least determining that the original test output does not match the first mutated test output.

20. The method of claim 17, wherein the method further comprises performing defect analysis of the corrected original program code based on constructing a second mutated program.

\* \* \* \* \*